(12) United States Patent
Wu et al.

(10) Patent No.: US 12,523,560 B2
(45) Date of Patent: Jan. 13, 2026

(54) PIEZOELECTRIC MEMS ACOUSTIC SENSOR

(71) Applicant: UNITED MICROELECTRONICS CENTER CO., LTD., Chongqing (CN)

(72) Inventors: Pengcheng Wu, Chongqing (CN); Wei Mong Tsang, Chongqing (CN)

(73) Assignee: UNITED MICROELECTRONICS CENTER CO., LTD., Chongqing (CN)

( * ) Notice: Subject to any disclaimer, the term of this patent is extended or adjusted under 35 U.S.C. 154(b) by 919 days.

(21) Appl. No.: 17/775,875

(22) PCT Filed: Nov. 12, 2020

(86) PCT No.: PCT/CN2020/128248
§ 371 (c)(1),
(2) Date: May 10, 2022

(87) PCT Pub. No.: WO2021/093796
PCT Pub. Date: May 20, 2021

(65) Prior Publication Data
US 2022/0390310 A1    Dec. 8, 2022

(30) Foreign Application Priority Data
Nov. 15, 2019 (CN) .......................... 201911117499.3

(51) Int. Cl.
*G01L 9/08* (2006.01)
*B81B 3/00* (2006.01)

(52) U.S. Cl.
CPC .............. *G01L 9/08* (2013.01); *B81B 3/0018* (2013.01)

(58) Field of Classification Search
CPC ....... G01L 9/08; G01L 19/0618; G01L 23/10; B81B 3/0018; H04R 2201/003; H04R 7/125; H04R 17/02
See application file for complete search history.

(56) References Cited

U.S. PATENT DOCUMENTS

2008/0296529 A1* 12/2008 Akiyama ............. H10N 30/306
                                                    252/62.9 PZ
2009/0129611 A1    5/2009 Leidl et al.
(Continued)

FOREIGN PATENT DOCUMENTS

CN    106895924 A *  6/2017    ............... G01L 1/18
CN    107436204 A    12/2017
(Continued)

OTHER PUBLICATIONS

European Patent Office, Extended European Search Report Issued in Application No. 20886464.5, Nov. 6, 2023, Germany, 9 pages.
(Continued)

*Primary Examiner* — Thomas Truong
(74) *Attorney, Agent, or Firm* — Kilpatrick Townsend & Stockton LLP

(57) ABSTRACT

Provided is a piezoelectric MEMS acoustic sensor, comprising a substrate, an inner electrode area, and an outer electrode area; the outer electrode area is located at the periphery of the inner electrode area; a lower support layer is provided on the top of the substrate, the inner electrode area and the outer electrode area are located on the lower support layer, and an upper support layer made of silicon-based material is provided on the top surfaces of the inner electrode area and the outer electrode area. The piezoelectric MEMS acoustic sensor has high sensitivity, strong resistance to hydrostatic pressure, and satisfies application requirements of different pressure resistance and operating water depth.

16 Claims, 4 Drawing Sheets

(56) References Cited

U.S. PATENT DOCUMENTS

| | | | | |
|---|---|---|---|---|
| 2010/0107772 A1* | 5/2010 | Takizawa | ................ | G01L 9/008 |
| | | | | 73/723 |
| 2012/0206014 A1* | 8/2012 | Bibl | ....................... | G10K 11/32 |
| | | | | 310/330 |
| 2017/0343429 A1 | 11/2017 | Wu | | |
| 2019/0193116 A1* | 6/2019 | Horsley | ................ | G10K 9/122 |
| 2019/0229256 A1* | 7/2019 | Dejaeger | ................ | H10N 30/50 |

FOREIGN PATENT DOCUMENTS

| | | |
|---|---|---|
| CN | 107631827 A | 1/2018 |
| CN | 108917991 A | 11/2018 |
| CN | 109141731 A | 1/2019 |
| CN | 110196124 A | 9/2019 |
| CN | 110793708 A | 2/2020 |
| DE | 102005008514 B4 | 5/2019 |
| JP | 2012189332 A | 10/2012 |
| KR | 101502762 B1 | 3/2015 |

OTHER PUBLICATIONS

PCT International Search Report and Written Opinion International Application No. PCT/CN/128248; dated Jan. 28, 2021; 14 pages.

\* cited by examiner

PIEZOELECTRIC MEMS ACOUSTIC SENSOR

CROSS-REFERENCE TO RELATED APPLICATIONS

This application is a 35 U.S.C. 371 Patent Application of PCT Application No. PCT/CN2020/128248 filed on Nov. 12, 2020, which claims priority to Chinese Patent Application No. 201911117499.3, filed on Nov. 15, 2019, and entitled "PIEZOELECTRIC MEMS ACOUSTIC SENSOR", each of which is incorporated herein by reference.

TECHNICAL FIELD

The present disclosure generally relates to MEMS sensor technology field, and more particularly, to a piezoelectric MEMS acoustic sensor.

BACKGROUND

With the development of microelectronics technology, integrated circuit technology and processing technology, MEMS sensors technology have greatly promoted development of sensors toward miniaturization, intelligentization, multifunctionalization and networking. MEMS sensors have advantages such as small size, light weight, low power consumption, high reliability, high sensitivity, easy integration, and resistance to harsh working environments. Therefore, MEMS sensors have been gradually taking the sensor market and replacing the dominance of traditional mechanical sensors, and have been favored in various fields such as consumer electronics, automotive industry, aerospace, marine equipment, machinery, chemical industry, and medicine.

At present, a piezoelectric layer of an existing piezoelectric MEMS acoustic sensor with high sensitivity can be made of AlN material. Due to restriction of manufacturing process, the thickness of a double-electrode bimorph structure of Mo/AlN/Mo/AlN/Mo has a maximum value of about 2 μm, which cannot survive under high pressure state. For improving a pressure resistance to the sensor, a support layer is added below the piezoelectric layer of a sensor, wherein the piezoelectric layer is a single-layered structure (like a structure of a lower support layer added with a Mo/AlN/Mo structure). However, the resulted acoustic pressure sensitivity is still unsatisfying, which is not suitable for applications that require a high sensitivity in a high pressure environment.

SUMMARY

Embodiments in the present disclosure provide a piezoelectric MEMS acoustic sensor.

In an embodiment of the present disclosure, a piezoelectric MEMS acoustic sensor is provided. The piezoelectric MEMS acoustic sensor includes: a substrate, an inner electrode area, and an outer electrode area. Wherein, the inner electrode area and the outer electrode area both include a top electrode, an upper piezoelectric layer, a middle electrode, a lower piezoelectric layer and a bottom electrode stacked from top to bottom. The top electrode, the middle electrode and the bottom electrode in the inner electrode area are spaced from the top electrode, the middle electrode and the bottom electrode in the outer electrode area correspondingly. A lower support layer is disposed on the top of the substrate, both the inner electrode area and the outer electrode area are disposed on the lower support layer, and an upper support layer is disposed on both the top surface of the inner electrode area and the outer electrode area.

The structure of piezoelectric MEMS acoustic sensor is mainly designed based on a stress distribution of a circular thin plate (with a radius of a). Restricted by manufacturing process, the thickness of a double-electrode bimorph structure made of $Mo/Sc_xAl_{1-x}N/Mo/Sc_xAl_{1-x}N/Mo$ has a maximum value generally not greater than 2 μm. When an external pressure applied on the sensor is too large, a piezoelectric film may fracture and fail from an excessive deformation. With a structure of the upper support layer and the lower support layer in combination with the top electrode, the upper piezoelectric layer, the middle electrode, the lower piezoelectric layer and the bottom electrode, the thickness of the whole film is increased. Therefore, the resistance to the hydrostatic pressure can be enhanced, which enables the MEMS acoustic sensor to satisfy application requirements of different withstand pressures and operating depths in water, wherein the upper support layer may be made of silicon-based materials.

In some embodiment, the inner electrode area, the outer electrode area, and the upper support layer and the lower support layer where the inner electrode area and the outer electrode area are located all generate a stress deformation of a convex or a concave in a same direction. In some embodiment, a large residual stress may be produced within the tailored upper support layer, a deformation may occur and other parts attached to the upper support layer may be driven to deform. By controlling a direction of the stress, a stress deformation of a convex or concave may be generated to improve sensitivity. For a concave stress deformation, the stress deformation of the concave caves in the base, which is consistent with the deformation direction caused by pressure and is thus unfavorable for improvement of resistance to water pressure. For a convex deformation, due to the direction of convex deformation being opposite to the direction of external pressure on the sensor, a part of the deformation caused by the external pressure can be offset, which means the maximum external pressure that the sensor can withstand can be increased during normal operation. Therefore, the sensitivity can be improved, which is also beneficial for the structure to work under deeper water or in an environment with a larger external pressure.

In above-mentioned embodiments, the upper piezoelectric layer and the lower piezoelectric layer are symmetrically distributed on both sides of the middle electrode. The middle electrode includes a neutral layer, and the stress on the middle electrode is zero. For the upper piezoelectric layer and the lower piezoelectric layer with a same distance to the middle electrode, stresses generated are equal in value and opposite in direction. Thus, charges distributed on the upper piezoelectric layer are opposite to charges distributed on the lower piezoelectric layer in polarity. Further, a same piezoelectric layer which is parallel to the middle electrode has stresses in opposite directions in the inner electrode area and in the outer electrode area. Charges generated in the piezoelectric layer between the top electrode and the middle electrode in the outer electrode area and charges generated between the bottom electrode and the middle electrode in the inner electrode area are collected, which can realize an aggregation of charges. Charges generated in the piezoelectric layer between the top electrode and the middle electrode in the inner electrode area, and charges generated between the bottom electrode and the middle electrode in the outer electrode area are collected, which can realize an aggregation of charges. By a differential processing on charges obtained in above areas, charges may amount to 4 times of charges in a case where a single piezoelectric layer is used and only the inner electrode is measured theoretically, which is favorable for further improving the sensitivity of the sensor.

Embodiments of the present disclosure have following benefits:

1. The upper support layer and the lower support layer are attached to the top electrode, the upper piezoelectric layer, the middle electrode, the lower piezoelectric layer and the bottom electrode. A structure of the inner electrode area and the outer electrode area is thus attached to the upper support layer and the lower support layer. Therefore, the thickness of the whole film can be increased and the resistance to the hydrostatic pressure can be enhanced, which enables the MEMS acoustic sensor to meet requirements of working under different withstand pressures and working depths.

2. The inner electrode area, the outer electrode area, the upper support layer and the lower layer may produce stress deformations in a same direction, which can improve stress distribution on the sensor under pressure, and improve the sensitivity of the sensor.

Figure 1:
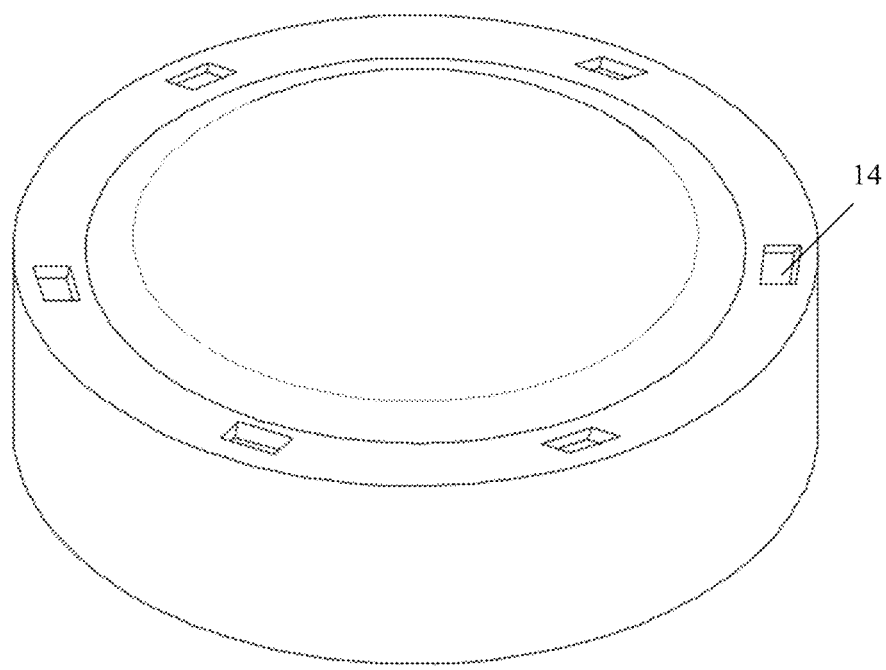
FIG. 1 schematically illustrates a structural diagram of a piezoelectric
MEMS acoustic sensor according to an embodiment of the present disclosure.

Reference signs: 1—substrate; 2—lower support layer; 3—lower piezoelectric layer; 4—upper piezoelectric layer; 5—upper support layer; 6—outer top electrode; 7—outer middle electrode; 8—outer bottom electrode; 9—inner top electrode; 10—inner middle electrode; 11—inner bottom electrode; 12—outer electrode area; 13—inner electrode area.

DETAILED DESCRIPTION

In order to clarify the object, characteristic and advantages of embodiments of the present disclosure, the embodiments of present disclosure will be described clearly in detail in conjunction with accompanying drawings.

In an embodiment of the present disclosure, a piezoelectric MEMS acoustic sensor is provided. Referring to FIG. 1-FIG. 4, the piezoelectric MEMS acoustic sensor includes: a substrate 1, an inner electrode area 13, and an outer electrode area 12. Wherein, the inner electrode area 13 and the outer electrode area 12 both include a top electrode, an upper piezoelectric layer 4, a middle electrode, a lower piezoelectric layer 3 and a bottom electrode stacked from top to bottom. The top electrode, the middle electrode and the bottom electrode in the inner electrode area 13 are spaced away from the top electrode, the middle electrode and the bottom electrode in the outer electrode area 12 correspondingly. A lower support layer 2 is disposed on the top of the substrate. Both the inner electrode area 13 and the outer electrode area 12 are disposed on the lower support layer 2. An upper support layer 5 made of silicon-based materials is disposed on both the top surface of the inner electrode area 13 and the outer electrode area 12.

In some embodiment, the piezoelectric MEMS acoustic sensor is mainly designed based on stresses distributed on a circular thin plate (with a radius of a) in structure under pressure. Restricted by a manufacturing process, a double-electrode bimorph structure of $Mo/Sc_xAl_{1-x}N/Mo/Sc_xAl_{1-x}N/Mo$ has a maximum thickness generally not greater than 2 μm. If an external pressure on the sensor is too large, a piezoelectric film may fracture and fail from an excessive deformation. With a structure the upper support layer and the lower support layer in combination with the top electrode, the upper piezoelectric layer, the middle electrode, the lower piezoelectric layer and the bottom electrode, the thickness of the film is increased and the resistance to the hydrostatic pressure can be enhanced, which enables the MEMS acoustic sensor to meet application requirements of different withstand pressure and working depths. According to some embodiment of the present disclosure, the upper support layer 5 and the lower layer 2 may be made of materials such as Si or $Si_3N_4$, and a cavity is disposed in the substrate 1.

Figure 3:
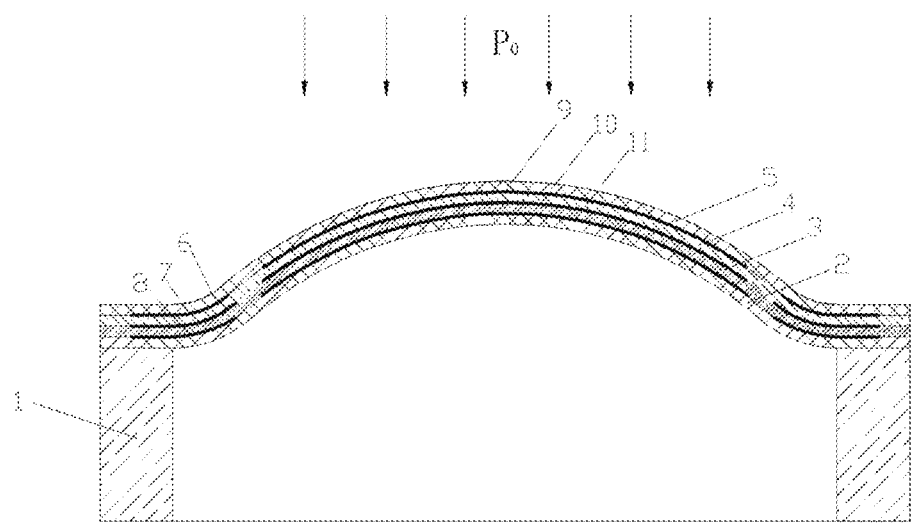
FIG. 3 schematically illustrates a cross-sectional view of a piezoelectric MEMS acoustic sensor according to an embodiment of the present disclosure.
Figure 4:
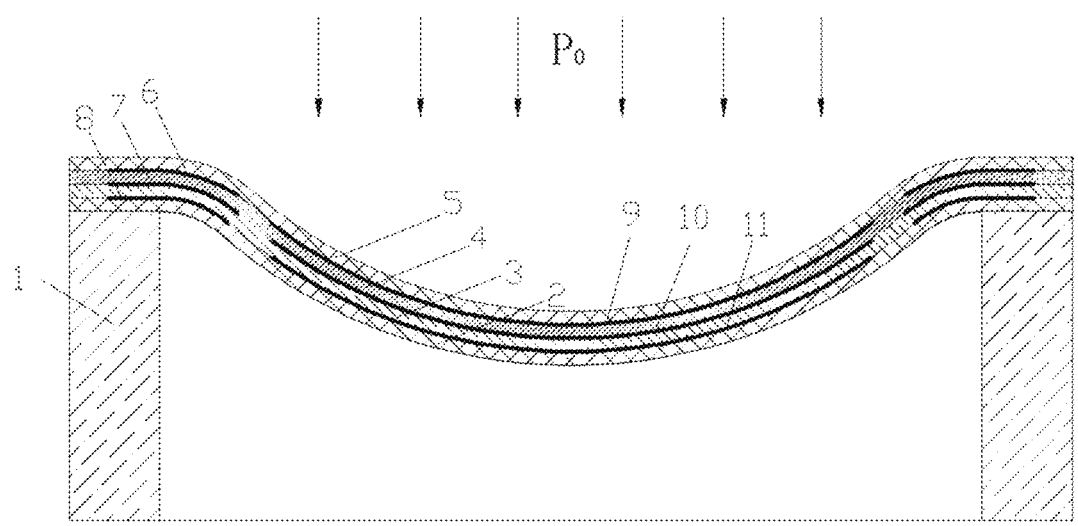
FIG. 4 schematically illustrates a cross-sectional view of a piezoelectric MEMS acoustic sensor according to another embodiment of the present disclosure.

In some embodiment, stress deformations generated in all of the inner electrode area 13, the outer electrode area 12, and the upper support layer 5 and the lower support layer 2 where the inner electrode area 13 and the outer electrode area 12 locates have a same direction. To improve the sensitivity, the stress deformation may be an inner concave on the top surface of the support layer. Referring to FIG. 4, the inner concave may cave toward the substrate, which is consistent with the direction of the external pressure $P_0$, and can improve the sensitivity. Referring to FIG. 3, the stress deformation may be a protrusion on the top surface of the support layer, and the protrusion is arc-shaped. Due to the convex deformation being opposite to the direction of the external pressure on the sensor, the convex deformation can offset a part of the deformation caused by the external pressure. Accordingly, more external pressure can be withstood during normal operation, which is beneficial for the structure to work under deeper water or in an environment with a larger external pressure. Therefore, the convex deformation is preferable. In this way, both the sensitivity and the resistance to water pressure of the MEMS acoustic sensor can be improved.

According to the embodiment of the present disclosure, the lower support layer 2 and the substrate 1 can be attached by bonding. In other embodiments, the attachment can be performed differently. All structures on the lower support layer 2 including the upper piezoelectric layer 4, the lower piezoelectric layer 3 and the upper support layer 5 may be obtained by growth. Therefore, stress deformations may be produced among the upper piezoelectric layer 4, the lower piezoelectric layer 3 and the upper support layer 5, which may further produce stress deformations in the inner electrode area, in the outer electrode area, and in the upper support layer 5 and the lower support layer 2 where the inner electrode area and the outer electrode area locates to form an arc-shaped protrusion. As shown in FIG. 3, the direction of the arc-shaped protrusion is opposite to the direction of an external pressure $P_0$. When the sensor is pressed by the external pressure $P_0$, the protrusion can offset a part of the deformation caused by the external pressure $P_0$, which can thus improve the sensitivity and the performance of resistance to water pressure of the MEMS acoustic sensor. Accordingly, the maximum external pressure $P_0$ that the sensor can withstand can be enhanced during normal operation, which is beneficial for working under deeper water or in an environment with a larger external pressure.

As shown in FIG. 3 and FIG. 4, the upper piezoelectric layer 4 and the lower piezoelectric layer 3 are symmetrically distributed on both sides of the middle electrode. Both the upper piezoelectric layer 4 and the lower piezoelectric layer 3 are piezoelectric layers made of a piezoelectric material with a same thickness. The piezoelectric material includes at least one selected from a group consisting of lead zirconate titanate, aluminum nitride, zinc oxide and scandium-doped aluminum nitride. In some embodiment, scandium-doped aluminum nitride can be adopted, which can greatly enhance the piezoelectric coefficient of AlN, and the sensitivity of the sensor can thus be greatly improved. Specifically, the scandium-doped aluminum nitride is made of $Sc_xAl_{1-x}N$ (0<x<1). The middle electrode includes a neutral layer whose stress is zero. For the upper piezoelectric layer and the lower piezoelectric layer with a same distance to the middle electrode, stresses are equal in value and opposite in direction. Thus, charges distributed on the upper piezoelectric layer are opposite to charges distributed on the lower piezoelectric layer in polarity. A same piezoelectric layer which is parallel to the middle electrode have stresses in opposite directions in the inner electrode area and in the outer electrode area. Charges generated in the piezoelectric layer between the top electrode and the middle electrode in the outer electrode area and charges between the bottom electrode and the middle electrode in the inner electrode area are collected, which can realize an aggregation of charges. Charges generated in the piezoelectric layer between the top electrode and the middle electrode in the inner electrode area, and charges between the bottom electrode and the middle electrode in the outer electrode area are collected, which can realize an aggregation of charges. By a differential processing on charges obtained in above areas, charges may amount to 4 times of charges in a situation where a single piezoelectric layer is adopted and only the inner electrode is measured theoretically, which is favorable for improving the sensitivity of the sensor.

As shown in FIG. 3 and FIG. 4, the upper support layer 5 and the lower support layer 2 are distributed symmetrically relative to the middle electrode. The upper support layer 5 and the lower support layer 2 are spaced apart and are symmetrical integrally, the upper piezoelectric layer and the lower piezoelectric layer are still in symmetry. In this way, the improvement of the structure on the sensitivity can be maintained.

As shown in FIG. 3 and FIG. 4, a plurality of electrode connection grooves are configured on the surface of the upper support layer 5 for connecting the top electrode, the middle electrode, and the bottom electrode respectively. The plurality of electrode connection grooves are disposed on an area of the upper support layer 5 outer than where the inner electrode area 13 and the outer electrode area 12 are located.

Figure 2:
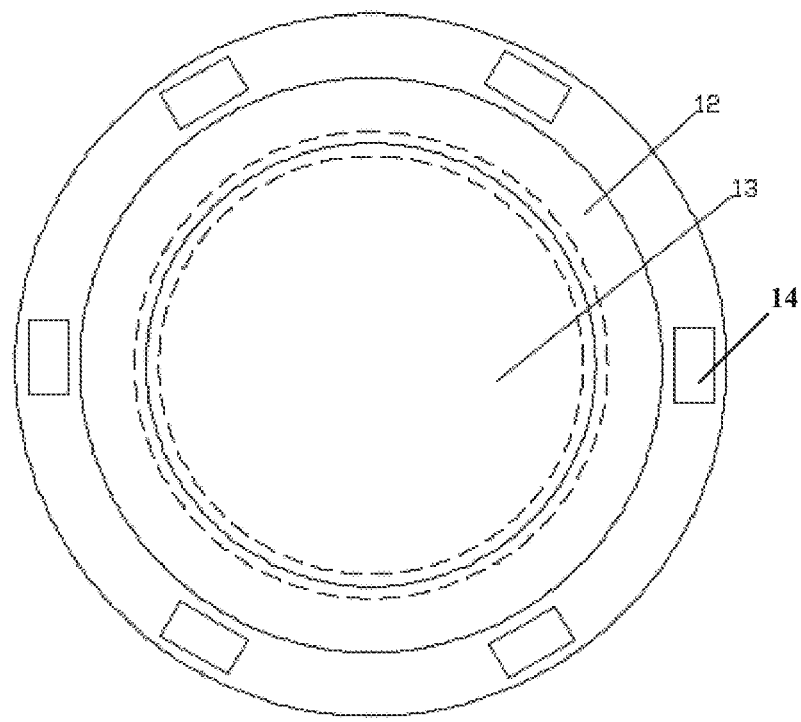
FIG. 2 schematically illustrates a top view of a piezoelectric MEMS acoustic sensor according to an embodiment of the present disclosure.

As shown in FIG. 2, the plurality of electrode connection grooves are distributed along the circumferential direction of the upper support layer 5. An even distribution can be adopted to make sure that there is enough space for wiring.

The upper piezoelectric layer and the lower piezoelectric layer, the upper support layer 5 and the lower support layer 2, and the top electrode and the bottom electrode are distributed symmetrically relative to the middle electrode. Along a given radius r, stresses linearly distribute along the direction of thickness. The stress is zero at the middle electrode, and stresses above and below the middle electrode are opposite in direction. Generally, for a circular thin plate which is fixed on the circumference, there exists a circle with a radius r=na having stresses of zero (0<n<1). With the circle of radius r=na as an interface, the inner and outer parts beside the circle are opposite in direction of stresses. An inner bottom electrode 11, an outer bottom electrode 8, an inner middle electrode 10, an outer middle electrode 7, an inner top electrode 9, and an outer top electrode 6 can be formed by disconnecting the bottom electrode, the middle electrode and the top electrode at the interface of r=na. By collecting charges generated through the stresses at different distributions, theoretically, the receiving sensitivity can reach 4 times relative to that of a single-electrode single-chip structure with a similar geometric structure, rigidity and material characteristics.

When the sensor is in operation, the external pressure $P_0$ generated by liquid, gas, the pressure generated by sonic waves and so on is directly applied on the upper support layer 5. The pressure is transmitted to the upper piezoelectric layer 4, the lower piezoelectric layer 3, and the lower support layer 2. Due to the piezoelectric effect of the piezoelectric layer made of $Sc_xAl_{1-x}N$, charges are generated on the surface of the piezoelectric material, and the change of sound pressure can cause a change of charges on the piezoelectric layer surface. By wiring the inner bottom electrode 11, the outer bottom electrode 8, the inner middle electrode 10, the outer middle electrode 7, the inner top electrode 9, and the outer top electrode 6 reasonably, charges generated by the sound pressure can be measured, and thus the sound pressure of the sonic waves can be monitored.

What is claimed is:

1. A piezoelectric micro-electromechanical system (MEMS) acoustic sensor, comprising:
   a substrate, an inner electrode area, and an outer electrode area,
   wherein the inner electrode area and the outer electrode area both comprise a top electrode, an upper piezoelectric layer, a middle electrode, a lower piezoelectric layer and a bottom electrode stacked from top to bottom, the top electrode, the middle electrode, and the bottom electrode in the inner electrode area are spaced from the top electrode, the middle electrode and the bottom electrode in the outer electrode area correspondingly, and a lower support layer is disposed on a top of the substrate, both the inner electrode area and the outer electrode area are disposed on the lower support layer, and an upper support layer is disposed on both a top surface of the inner electrode area and the outer electrode area;
   wherein a plurality of electrode connection grooves (14) are configured on a surface of the upper support layer (5) for connecting the top electrode, the middle electrode, and the bottom electrode, respectively, and the plurality of electrode connection grooves (14) are disposed on an area of the upper support layer (5) outer than where the inner electrode area (13) and the outer electrode area (12) are located.

2. The piezoelectric MEMS acoustic sensor according to claim 1, wherein the inner electrode area, the outer electrode area, and the upper support layer and the lower support layer where the inner electrode area and the outer electrode area are located have a stress deformation in a same direction.

3. The piezoelectric MEMS acoustic sensor according to claim 2, wherein the stress deformation comprises a protrusion formed on a top surface of the support layer.

4. The piezoelectric MEMS acoustic sensor according to claim 3, wherein the protrusion is arc-shaped.

5. The piezoelectric MEMS acoustic sensor according to claim 4, wherein the upper support layer and the lower support layer are distributed symmetrically relative to the middle electrode.

6. The piezoelectric MEMS acoustic sensor according to claim 3, wherein the upper support layer and the lower support layer are distributed symmetrically relative to the middle electrode.

7. The piezoelectric MEMS acoustic sensor according to claim 2, wherein the stress deformation comprises an inner concave surface formed on a top surface of the support layer.

8. The piezoelectric MEMS acoustic sensor according to claim 7, wherein the upper support layer and the lower support layer are distributed symmetrically relative to the middle electrode.

9. The piezoelectric MEMS acoustic sensor according to claim 2, wherein the upper piezoelectric layer and the lower piezoelectric layer are symmetrically distributed on both sides of the middle electrode.

10. The piezoelectric MEMS acoustic sensor according to claim 2, wherein the upper support layer and the lower support layer are distributed symmetrically relative to the middle electrode.

11. The piezoelectric MEMS acoustic sensor according to claim 1, wherein the upper piezoelectric layer and the lower piezoelectric layer are symmetrically distributed on both sides of the middle electrode.

12. The piezoelectric MEMS acoustic sensor according to claim 11, wherein both the upper piezoelectric layer and the lower piezoelectric layer are made of a piezoelectric material with a same thickness.

13. The piezoelectric MEMS acoustic sensor according to claim 12, wherein the piezoelectric material comprises at least one selected from a group consisting of lead zirconate titanate, aluminum nitride, zinc oxide, and scandium-doped aluminum nitride.

14. The piezoelectric MEMS acoustic sensor according to claim 13, wherein the scandium-doped aluminum nitride comprises $Sc_xAl_{1-x}N$.

15. The piezoelectric MEMS acoustic sensor according to claim 1, wherein the upper support layer and the lower support layer are distributed symmetrically relative to the middle electrode.

16. The piezoelectric MEMS acoustic sensor according to claim 1, wherein the plurality of electrode connection grooves (14) are distributed along a circumferential direction of the upper support layer.

* * * * *